United States Patent
Zhou et al.

(10) Patent No.: US 7,146,054 B2
(45) Date of Patent: Dec. 5, 2006

(54) METHOD OF DIGITAL IMAGE DATA COMPRESSION AND DECOMPRESSION

(75) Inventors: Xing-Ping Zhou, Taipei (TW); Jian-Wei Fan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 779 days.

(21) Appl. No.: 10/463,332

(22) Filed: Jun. 18, 2003

(65) Prior Publication Data

US 2004/0258316 A1    Dec. 23, 2004

(51) Int. Cl.
*G06K 9/36* (2006.01)
*G06K 9/34* (2006.01)

(52) U.S. Cl. .................................... 382/233

(58) Field of Classification Search ............. 382/173, 382/218, 219, 232, 233, 244, 246; 375/240.25; 341/65, 69, 76, 90; 345/502, 571, 561
See application file for complete search history.

(56) References Cited

U.S. PATENT DOCUMENTS

| | | | | |
|---|---|---|---|---|
| 4,903,128 A | * | 2/1990 | Thoreau | 348/618 |
| 5,459,513 A | * | 10/1995 | Oddou | 375/240.1 |
| 5,661,822 A | * | 8/1997 | Knowles et al. | 382/233 |
| 5,777,677 A | * | 7/1998 | Linzer et al. | 375/240.11 |
| 6,002,801 A | * | 12/1999 | Strongin et al. | 382/233 |
| 6,567,556 B1 | * | 5/2003 | Bramley | 382/233 |
| 7,076,104 B1 | * | 7/2006 | Keith et al. | 382/233 |
| 7,110,608 | * | 9/2006 | Chan et al. | 382/239 |
| 7,110,609 | * | 9/2006 | Malvar | 382/240 |
| 2004/0037464 A1 | * | 2/2004 | Shi et al. | 382/190 |

\* cited by examiner

*Primary Examiner*—Amir Alavi
(74) *Attorney, Agent, or Firm*—Rabin & Berdo, P.C.

(57) ABSTRACT

A method for compressing and decompression digital image data. When compressing, the method begins by choosing a reference row. The relative data between the reference row and the current row is compared to search for the differential data set. The largest matching data set of the differential data set is searched starting from the starting position of the last differential data set. According to the matching conditions, the data type of the to-be-compressed data is first verified, then the to-be-compressed data set type and its relative referencing value are verified. Finally, the relative coding process is started. This process has a higher compression ratio and decompression speed, and increases the compression speed dramatically.

10 Claims, 6 Drawing Sheets start of the current differentia data segment

```
2: C0 3E 03 E0 3E 03 E0 (7E 07) E0 3E 07 E0 7E 07
3: C0 3E 03 E0 3E 03 E0 (3E 03) E0 3E 03 E0 3E 07
``` end of the current differentia data segment

FIG.3 start of the current differentia data segment

```
2 : C0 3E 03 E0 3E 03 E0 7E 07 E0 3E 07 E0 7E 07
3 : C0 3E 03 E0 3E 03 E0 3E 03 E0 3E 03 E0 3E 07
``` end of the current differentia data segment

| 7 | 6 | 5 | | | 0 |
|---|---|---|---|---|---|
| 0 | 0 | Copy Count | Data 1 | ... | Data N |

FIG.6-1

| 7 | 6 | 5 | 3 | 2 | 0 |
|---|---|---|---|---|---|
| 0 | 1 | CODE 1 | | CODE2 | |

FIG.6-2

| 7 | 6 | 5 | 3 | 2 | 0 |
|---|---|---|---|---|---|
| 1 | 0 | Copy Count | | Copy From | |

FIG.6-3

| 7 | 6 | 5 | 0 |
|---|---|---|---|
| 1 | 1 | Copy Count | |

METHOD OF DIGITAL IMAGE DATA COMPRESSION AND DECOMPRESSION

BACKGROUND OF THE INVENTION

1. Field of Invention

The invention relates to a method of data compression and decompression, especially the compression and decompression method of digital image data.

2. Related Art

Data compression is a well-known topic. Compression usually means to convert some given data to a different format that takes less space. Transmitting compressed data decreases the transmission time dramatically; storing compressed data also decreases cost. When the original data is needed, a decompression method is used to restore the data to its original condition. There are two types of compression: reversible compression (zero-distortion, zero-error coding or redundancy coding), and irreversible compression (distortion coding or isentropic compression). Reversible compression looks at data as a combination of information and redundancy. It operates by following the principles to eliminate or decrease the redundancy; therefore is a reversible process. Some well-known reversible compression methods are Shanno-Fano Coding, Adaptive Huffman Coding and LZ77 Coding. The irreversible compression method not only eliminates redundancy, but also ignores some unimportant details. It has a better compression ratio, but unavoidably losses some information; it is also impossible to restore the data back to its original condition. Some examples of irreversible data compression are Predictive Coding, Block Truncated Coding, and Subband Coding.

The LZ77 compression method, for example, uses the previously read input data as a dictionary and uses a pointer for the data segment in the dictionary to replace the previously input data and achieve data compression.

The LZ77 compression method achieves a better compression ratio and is compatible with various text files (literal, binary system). However, it looks for matching word strings in the dictionary during compression. Therefore, when the dictionary's content becomes large, the compression process takes a long time and is not very efficient. The decompression rate is not influenced by the size of the dictionary content because it only has to duplicate the word strings. Overall, LZ77 is an unbalanced compression method that is not very efficient, uses more hardware and costs more. Another problem is caused by words that cannot be found in the dictionary and thus require extra effort to mark as incompressible.

Digital images are two-dimensional matrix data consisting of rows and columns and have some unique qualities from other normal data types. Focusing on these unique qualities, many zero-distortion compression methods were created for digital images. The DeltaRow Compression method compares the current row to the previous row and only compresses the different data between the two rows. The DeltaRow Compression method is simple and effective for the two-dimensional matrix data consisting of rows and columns, but does not have a high enough compression ratio for complex images such as high-resolution images.

SUMMARY OF THE INVENTION

The invention solves the above problem and provides compression and decompression method for two-dimensional images that not only has the high compression ratio of the LZ77 compression algorithm and its high decompression speed, but also has the efficiency of the DeltaRow compression algorithm.

The invention's digital image data compression method starts by choosing the reference row. It then compares the reference row and the relative data in the non-coded portion in the current row to find the first differentia data segment. Beginning from the data before the starting position of the current differentia data segment, it looks for the largest match data segment matching the data after the starting position of the current differentia data segment. Based on the matching condition, it verifies the type of the to-be-compressed data. Based on the to-be-compressed data type, it verifies the to-be-compressed data segment type and its relative parameters. Finally, based on the to-be-compressed data segment type and its parameters, it executes the related coding process.

The digital image data decompression method starts by verifying the current row's reference row. It then sets the point of writing at the beginning of the current row. It reads one code in and retrieves its data type and relative parameters. Lastly, it uses the data type and the parameters to decode the data.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5-1 illustrates, by example, the match data segment length that is greater than the data segment length;

FIG. 5-2 illustrates, by example, the match data segment length that is less than the data segment length;

FIG. 6-1 illustrates, by example, the first data type of the compression format for the coding process;

FIG. 6-2 illustrates, by example, the second data type of the compression format for the coding process;

FIG. 6-3 illustrates, by example, the third data type of the compression format for the coding process;

FIG. 6-4 illustrates, by example, the forth data type of the compression format for the coding process.

DETAILED DESCRIPTION OF THE INVENTION

The invention is a reversible compression method for digital image data that executes zero-distortion compression and decompression for two-dimensional digital images. Please refer to FIG. 1 for a flow diagram of the compression method of the digital image data. It first chooses the reference row (step 101), then compares the reference row and the data in the non-coded portion of the current row to find the first differentia data segment (step 102). Starting from the data before the starting position of the current differentia data segment, it looks for the largest match data segment data segment after the starting position of the current differentia data segment (step 103). Based on the matching condition, it verifies the type of the to-be-compressed data (step 104). Based on the to-be-compressed data type, it verifies the to-be-compressed data segment type and its related parameters (step 105). Finally, based on the to-be-compressed data segment type and its parameters, it executes the related encoding process (step 106).

Figure 1:
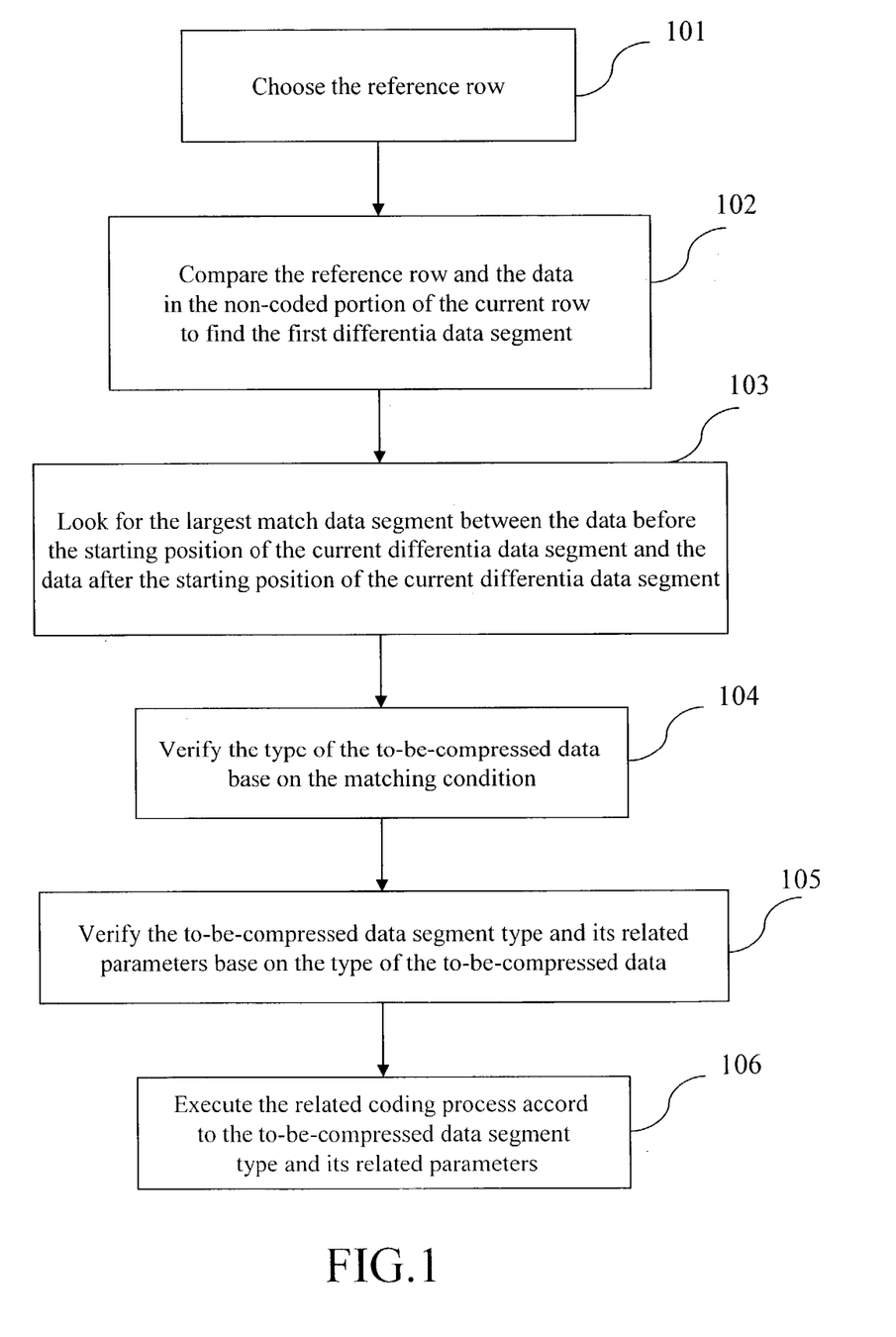
FIG. 1 illustrates, in flow diagram form, the digital image data compression method.

When the first differential data segment has been processed, if the end of the current row has not been reached, it looks for the next differential data segment starting from the next position after the end of previous coding section. It then repeats the matching and coding procedures until all of the data of the current row has been processed. The next row is treated as the current row and the procedures from the reference row selection are restarted, until the whole image is processed.

If the current compressing row is the first row of the image, the system provides a row of all zeros for reference.

There are many methods for selecting the reference row. For example, samples can be picked from the fixed position of the current row and several rows above the current row, and then compared with one another and with other rows. The row with the highest matching rate with the sample of the current row is used as the reference row.

Another method is to set up a data window with uniform length (the length of the data window should be long, such as 32 bytes), and then move the data window along the current row and several rows above the current row. If the data of the current row falling within the data window is the same as the data at the other row's relative position, then that row is chosen as the reference row.

If there is more than one row satisfying the reference row requirement, then the closest row to the current row is chosen.

The steps for verifying the first differential data segment start with comparing the noon-coded portion of the current row to the data at the relative position of the reference row. The position of the first differential data is then recorded as the starting position of the differentia data segment and the comparison is continued until the current row and the reference row have the same data at the relative position or the end of the row is reached. That position is then recorded as the ending position of the differential data segment.

Figure 2:
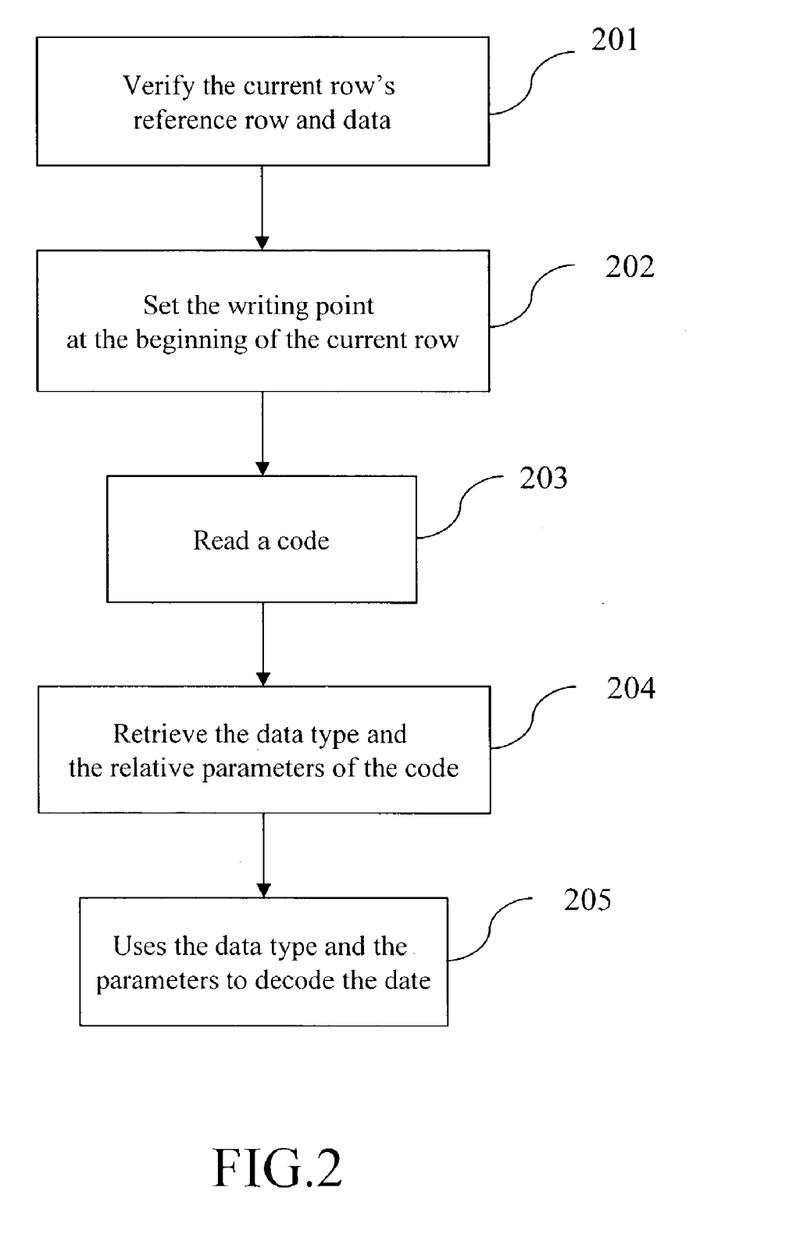
FIG. 2 illustrates, in flow diagram form, the digital image data decompression method.

Please refer to FIG. 2 for a flow diagram of the digital image data decompression method. First, the current row's reference row and data are verified (for plan 1 disclosed below, the data of reference row is copied to current row; for plan 2 disclosed below, the data of current row is directly rewrote without coping from reference row in advance) (step 201) and the writing point is set at the beginning of the current row (step 202). A code is read (step 203) and the data type and the relative parameters of the code are retrieved (step 204) and used to decode the data (step 205).

Before reaching the end of the row of coding data, codes are read continuously and the new current writing point is verified. The described decompression steps are executed according to the code's data type and relative parameters, until all the codes have been processed. The next row is then used as the current row and the procedures are executed starting from verifying the reference row again, until the whole image is recovered.

Figure 3:
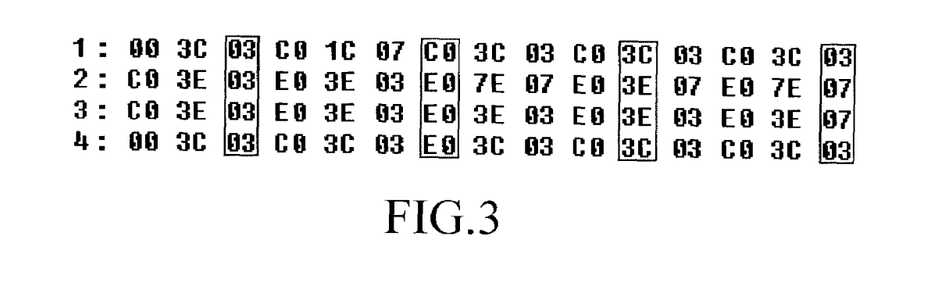
FIG. 3 illustrates, by example, a high-resolution image's data segment and choosing the referencing row.

The following is an example image data segment used for explaining the invention. Please refer to FIG. 3 for an example of a high-resolution image data segment and the process of choosing the reference rows. The high-resolution image has a width of 128 pixels and a height of 4 rows. If the selection requires 3 out of the 4 samples to be the same, the 4th row in FIG. 3 should choose row 1 as the reference row.

Figure 4:
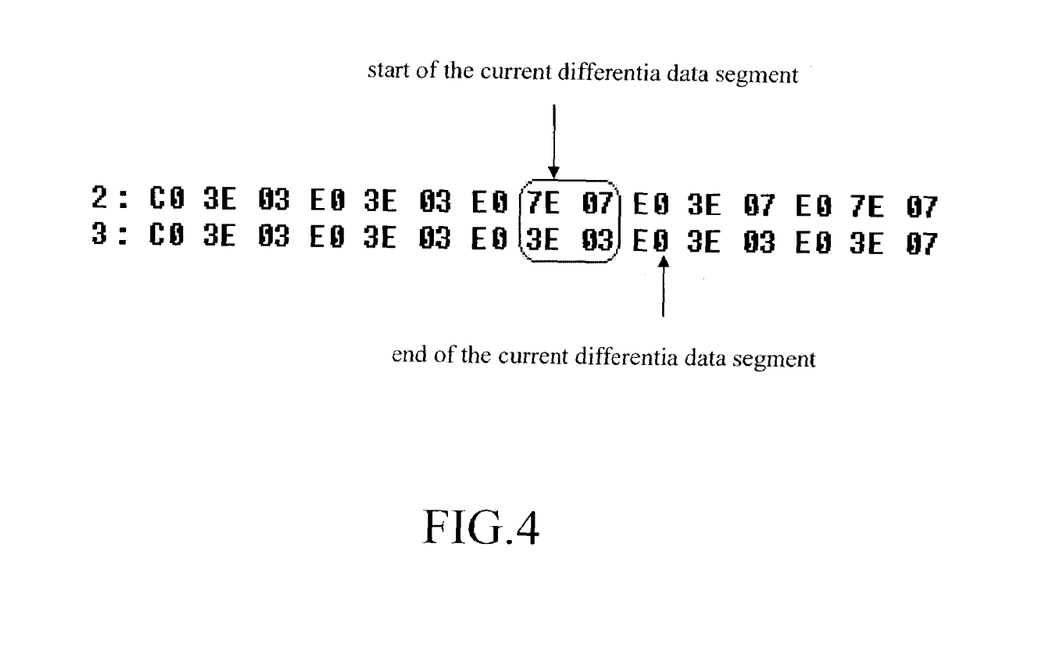
FIG. 4 illustrates, by example, searching for the first differentia data segment in the current row.

Please refer to FIG. 4 for an example of searching for the first differentia data segment in the current row. Suppose the current row is row 3 and the reference row is row 2. When comparing the data of the current row and reference row in their relative positions, if there are any differences, the current row's data position is recorded as the beginning position of the differentia data segment. The comparison process then continues until the data in the current row and the reference row matches or the end of the row is reached, which will be recorded as the end position of the differentia data segment. As shown in FIG. 4, the first differentia data segment between the current row and reference row are the two bytes starting with the 8th data 0x3E and ending with 9th data 0x03.

When the differentia data segment is being matched, the longest match data segment between the data before the differential data segment and the different data segment itself is determined. It is notable that when searching for the longest match data segment, it starts at the first data of the differentia data segment, but is not limited by the ending position of the differentia data segment. Rather, it is limited by the end of the current row. In other words, it searches for the longest match segment in the current row. If the matching length is longer than the differentia data segment's ending position, the portion of the data outside of the differentia data segment may be the same as or different from the relative data in the reference row. The advantage of this technique is that if the next differentia data segment between the current row and the reference row is included in the longest match data segment of the first differentia data segment, then the next differentia data segment does not have to be coded.

Figure 51:
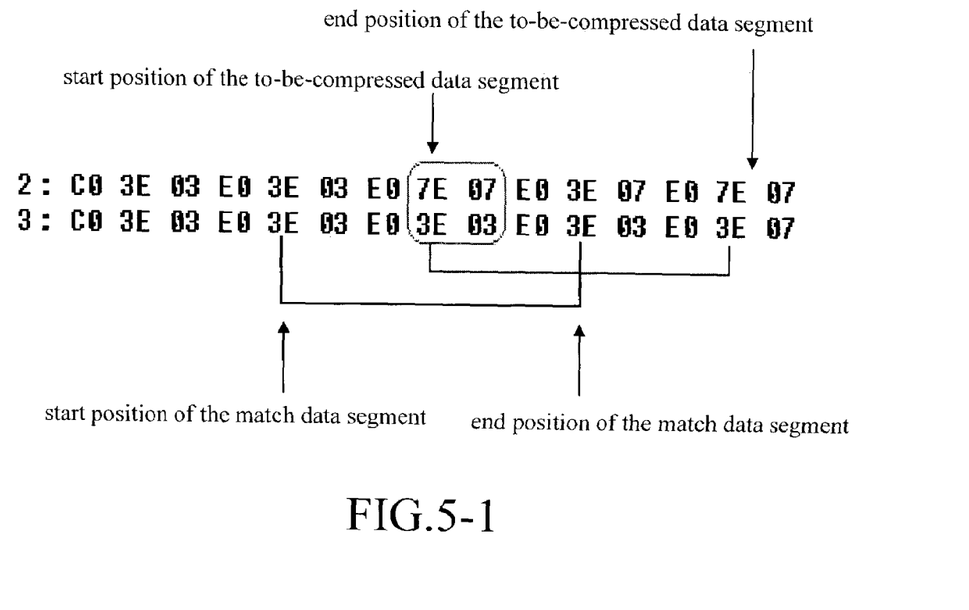

This situation is illustrated in FIG. 5-1. After finding the first differentia data segment between the current row and the reference row, it searches for the longest match segment in the 7 data in front of the differentia data segment. The longest match segment starts with the 5th data and the length is 7. Even though there are two more segments of data that are different, they don't have to be separately coded.

The longest matching length includes the following possibilities:

If the longest match data segment has a length of zero, then the differentia data segment's first data appears for the first time in the current row. Therefore, the first data is skipped and the starting position of the differentia data segment is moved to the second data and the matching process is started over. If the matching result is still zero and the end of the differentia data segment is reached, the skipped data is analyzed and condensed coding is attempted. If condensed coding cannot be executed, the data is set as the first data type (referred to as literal data). If condensed coding can be executed, the data is set as the second data type (referred to as condensable data).

If the longest matching data segment does not have a length of zero and is greater or equal to the length of the differentia data segment (shown in FIG. 5-1), the procedure checks and determines if there is any skipped and non-coded data, then attempts condensed coding to determine if they is any literal data or condensable data. The reference data information such as the matching data position and length for the differentia data segment is coded as the third data type (referred to as copied current row). It continues to search for the next differentia data segment between the current row and the reference row, starting from the position right after the end of the current coding position. In FIG. 5-1, the data segment's length is 2 and the longest matching length is 7.

Figure 52:
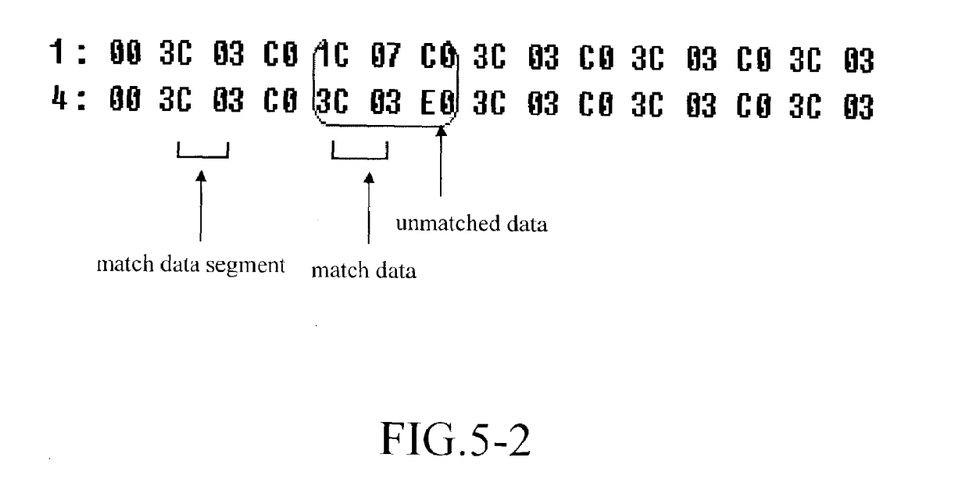

If the longest data segment does not have a length of zero and is less than the length of the data segment, as shown in FIG. 5-2, the compression process will first check if there is any skipped and non-coded data. It then attempts the condensed coding and verifies if it is literal data or condensable data. Data information such as the matching data position and length of the matching portion in the differentia data segment is coded as the copied current row data type. The starting position of the differentia data segment is moved to the next data position after the matching portion and repeats the described matching procedure with the new differentia data segment.

As shown in FIG. 5-2, the differentia data segment starting position is moved to 0xE0. Since there is no matching data for 0xE0, it is skipped. The end of the data segment is reached, and the compression process attempts to condense code the data 0xE0. The data position of the current row moves to the next data 0x3C and starts to search for the next differentia data segment.

The condensed coding theory is based on the following facts:

The two dimensional digital image data is distributed unevenly. It has been discovered in practice that certain data combinations appear in a much higher ratio then other combinations.

These fixed data combinations follow these rules:

In a data segment with length N, if all the consecutive 0s and 1s are recorded as one segment (1111000 has two segments), the data with a sum of no greater than 2 for the number of the 1 segments and 0 segments occurs much higher than other possibilities. In other words, there are fewer alternative 1s and 0s occurring, such as 11010110. For a data segment with length N, where N is 2's integer power, there are 2×N data combinations. It is possible to code all of (2N's N bits data's 2×N data)—(this makes no sense) into 2×N mark code with length of $Log_2 2 \times N = Log_2 N + 1$. It is then possible to add the data that is deemed uncompressible by the LZ77 method into the compressed data keeping the same length or even decreasing it. This compensates for the defects of processing uncompressible data by the LZ77 method and increases the compression ratio. The above method includes breaking down a long data segment into several short data segments; for example, breaking a 16 bit data segment into 2 eight bit or 4 four bit data segments for coding to satisfy the uneven distribution probability.

Here is an example using 4 binary data. In the two dimensional digital image data, it was tested and found that over 90% of the data is distributed within the sets of {0000, 0001, 0011, 0111, 1111, 1110, 1100, 1000}. These eight data segments can be represented using eight codes, such as using 000 to represent 0000, 001 for 0001, 010 for 0011, 011 for 0111, 110 for 1111, 101 for 1110, 110 for 1100, and 111 for 1000. In one byte, two bits are saved to record the fact that it is condensed coding. The data that originally needed an extra byte does not need it anymore. The successful rate for one byte coding depends on the fact that the higher four bits and lower four bits all fall within the coding parameter's probability (0.9×0.9=81%).

For example, the skipped number 0xE0 can be coded using the following:

0xE0 in binary form is 1110 0000. Following the above coding method, 1110 is represented as 101 and 0000 as 000; the compressed result is 101 and 000. If using two bits 00 to represent the condensed coding format, 0xE0 can be coded as 0010 1000, which is 0x28.

According to the needs of the coding plan, it is also possible to set the non-coded data before the first differentia data segment, which is the data of the current row that matches the relative data on the reference row position, as the forth data type (referred to as the copied reference row data).

Consecutive to-be-compressed data of the same type is grouped into a to-be-compressed data segment of such type.

Practical coding plans are different according to the parameters selection. Here are two coding plan examples:

Plan 1: after the described compression coding, the current row data is divided into three types for coding:

1. First coding data type: The literal format that cannot be compressed using LZ77, DeltaRow, condensed coding. The data format is:

| First coding type marker | Anchor offset | Copy count | Original data in the data segment |
|---|---|---|---|

2. Second coding data type: The condensed format that can be compressed using the condensed coding of the invention. The data format is:

| Second coding type marker | Anchor offset | Condense coded data |
|---|---|---|

3. Third coding data type: The current line copy formats that can be compressed using the LZ77 theory. The data format is:

| Third coding type marker | Anchor offset | Copy count | Copy from (Copied target location) |
|---|---|---|---|

When compressing data segments, the anchor offset between the current compressing data segment and the end of the last compressed data segment (the anchor) is recorded. When decompressing, the reference row is completely copied over to the current row and is corrected to receive the new row. When the data in the relative positions of the current row and the reference row is the same, it is not processed, and there is a problem regarding the verification of the position of the recovered data. If the compressed data segment is the first data segment of the current row, the anchor is at the beginning of the current row. After the data segment is compressed, the anchor is moved to the end point of the data segment. When decompressing, the point of writing is set at the beginning of the current row. A code is read in and its anchor offset is retrieved. The point of writing plus the anchor offset becomes the current point of writing. After writing a data, the point of writing moves forward one unit of data; when the whole data segment is written, the point of writing is moved to the end of the section. The above process is repeated until the whole row is processed.

Plan 2: After the above described compressed coding, the data in the current row is classified into four data types for coding:

1. First coding data type: The literal format that cannot be compressed using LZ77, DeltaRow, condensed coding. The data format is:

| First coding type marker | Anchor offset | Copy count | Original data in the data segment |
| --- | --- | --- | --- |

2. Second coding data type: The condensed format that can be compressed using the condensed coding of the invention. The data format is:

| Second coding type marker | Anchor offset | Condense coded data |
| --- | --- | --- |

3. Third coding data type: The current line copy formats that can be compressed using the LZ77 theory. The data format is:

| Third coding type marker | Anchor offset | Copy count | Copy from (Copied target location) |
| --- | --- | --- | --- |

4. Forth coding data type: The reference line copy format that has the same data as the reference row in the same position. The data format is:

| Forth coding type marker | Copy count |
| --- | --- |

Duplication of the target position means to copy the beginning position of the targeted data segment and the offset of the current position.

Figure 7:
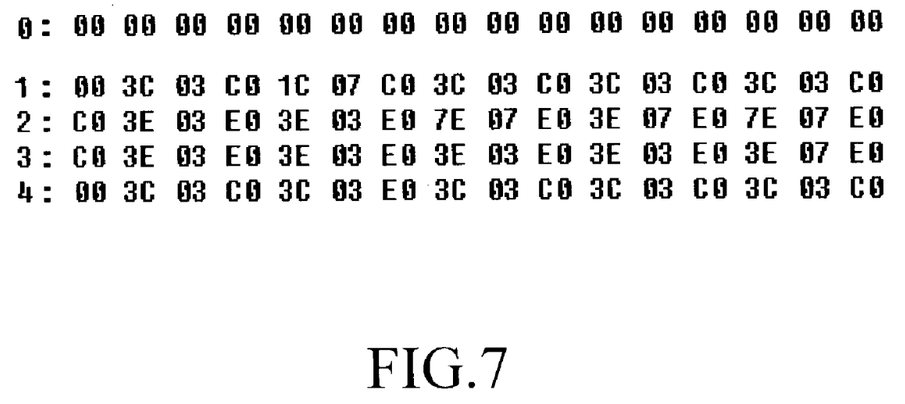
FIG. 7 illustrates, by example, a high-resolution picture's data segment used by the concrete coding method.
Figure 61:
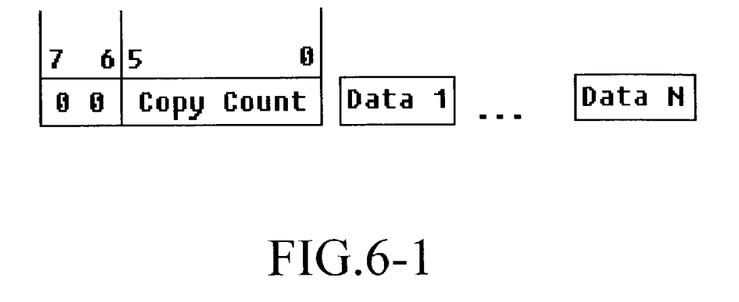

The image section in FIG. 7 is compressed using the above plan 2. The compression format is as follows:

1. Literal Format:

Referring to FIG. 6-1, "00" indicates literal coding and the copy count is the number of bytes following the current segment minus 1 (the copy count cannot be 0). Since the length is only 6, there can be at most 63 literal bytes (the copy count is 62, or 0x3E. If the literal bytes are more than 63 (such as 65), then one byte (0x01) is added after the current segment to represent the actual number of bytes, 64. The copy count is recorded as 63 (0x3F) and followed by the actual number of literal bytes.

Figure 62:
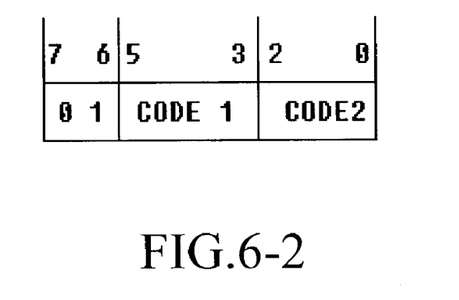

2. Condensed Format:

Referring to FIG. 6-2, "01" indicates condensed coding. Code 1 is the 3 bites condensed coding 1, and code 2 is the 3 bites condensed coding 2.

3. Current Row Copy Format

Figure 63:
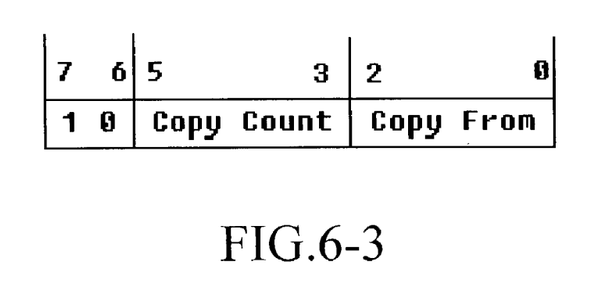

Referring to FIG. 6-3, "10" indicates current row copy coding, or the copy count, which is the number of bytes from the copied current row minus one (the copy count cannot be 0). "Copy From" is the offset between the copying position and the current position. Since the copy count has only a length of three, it can copy at most seven bytes (the copy count area is six). If there are more than seven bytes (for example, nine bytes), another byte is added at the end of the current segment (0x01) to represent the actual number of copied bytes, 8, and the copy count area is recorded as 7. Following the same principles, the "copy from" area can also add more bytes to solve the problem of the limited length of bytes.

Figure 64:
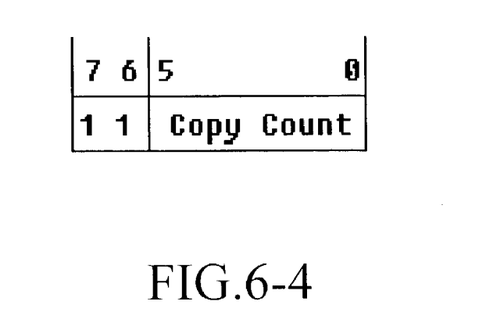

4. Reference Line Copy Format:

Referring to FIG. 6-4, 11 is the copied reference row coding mark; the copy count is the number of bytes of the duplicated reference row minus 1 (the copy count cannot be zero). Since it is only 6 digits long, it can at most represent 63 bytes, and the copy count is 62 (0x3E). If the copied bytes are more than 63, such as 65, a byte (0x01) is added at the end of the current segment to represent the actual number of bytes needing to be copied—64—and the copy count is changed to 63 (0x3F).

Row 0 in FIG. 7 is a reference row of all zeros provided by the system. Following the coding format of plan 2 described above, the coding result is (in binary form):

1: 11000000 01010110 01000010 01110000 01001110 01000011 10000011 10010110 10101011

2: 01110000 01010101 11000000 01101000 10010011 01011101 01000011 10001110 10001011 10010110

3: 11000110 10110011 11000001

4: 11000011 10001011 01101000 11001000

In hexadecimal form, they are:

1: C0 56 42 70 4E 43 83 96 AB

2: 70 55 C0 68 93 5D 43 8E 8B 96

3: C6 B3 C1

4: C3 8B 68 C8

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of digital image data compression, the method comprising the following steps:

choosing the reference row;

comparing the non-coded portion of the relative data between the reference row and the current row to find the first differentia data segment of the non-coded section;

looking for the largest match data segment between the data before the starting position of the current differentia data segment and the data after the starting position of the current differentia data segment;

verifying the to-be-compressed data type base on the matching condition;

verifying the to-be-compressed data segment type and its related parameters based on the to-be-compressed data type; and executing the related coding process based on the to-be-compressed data segment type and its related parameters.

2. The method of claim 1 wherein said method further comprises:

starting from the next position after the last end of coding position to continue searching the next differentia data segment between the current row and the reference row, and restarting the execution of the matching and coding procedures, until the all the data in the current row has been processed;

reposition the next row as the current row; and restarting the execution of the described steps starting from selecting the reference row until the whole image has been processed.

3. The method of claim 1 wherein said step of choosing the reference row, if the compressing row is the first row of the image, the system provides a row of all zeros for the reference row.

4. The method of claim 1 wherein said step of finding the first differentia data segment further comprises the following steps:
   comparing the non-coded portion of the data in the relative positions of the current row and the reference row one-by-one;
   recording the position of the first differential data as the starting position of the differentia data segment;
   continuing the comparison process until the relative positions of the current row and the reference row matches or end of the row is reached; and
   recording such position as the ending position of the differentia data segment.

5. The method of claim 1 wherein said step of verifying the to-be-compressed data type if the largest match data segment has a length of zero further comprises the following steps:
   skipping the starting data of the differentia data segment and restarting the described matching process at the starting position of the next differentia data segment; and
   analyzing the skipped data, then setting it as the first data type if it cannot be condense coded, or as the second data type if it can be condense coded.

6. The method of claim 1 wherein said step of verifying the to-be-compressed data type if the largest match data segment has a length of non-zero further comprises the following steps:
   searching and analyzing the skipped data, then setting it as the first data type if it cannot be condense coded, or as the second data type if it can be condense coded; and
   setting the matching portion of the differentia data segment starting from the current starting position as the third data type.

7. The method of claim 6 wherein said matching data section when the largest matching data section has a length of non-zero and less than the length of the current differentia data segment further comprises the following steps:
   moving the starting position of the current differentia data segment to the data position after the ending position of the matching portion and using the new current differentia data segment to restart the matching process.

8. The method of claim 1 wherein said verification step of the to-be-compressed data type further comprises the steps of verifying the non-coded data prior to the first differentia data segment as the forth data type.

9. The method of claim 1 wherein said verification step of the to-be-compressed data segment type sets the consecutive to-be-compressed data of the same type as one to-be-compressed data segment of such type.

10. A method of digital image decompression, the method comprising the following steps:
   verifying the current row's reference row and data;
   setting the writing point at the beginning of the current row;
   reading in a code;
   retrieving the data type and relative parameters of the code; and
   decoding the data according to the data type and relative parameters.

* * * * *